Feb. 15, 1927.
A. G. M. MICHELL
JOURNAL BEARING
Filed June 4, 1925
1,617,719
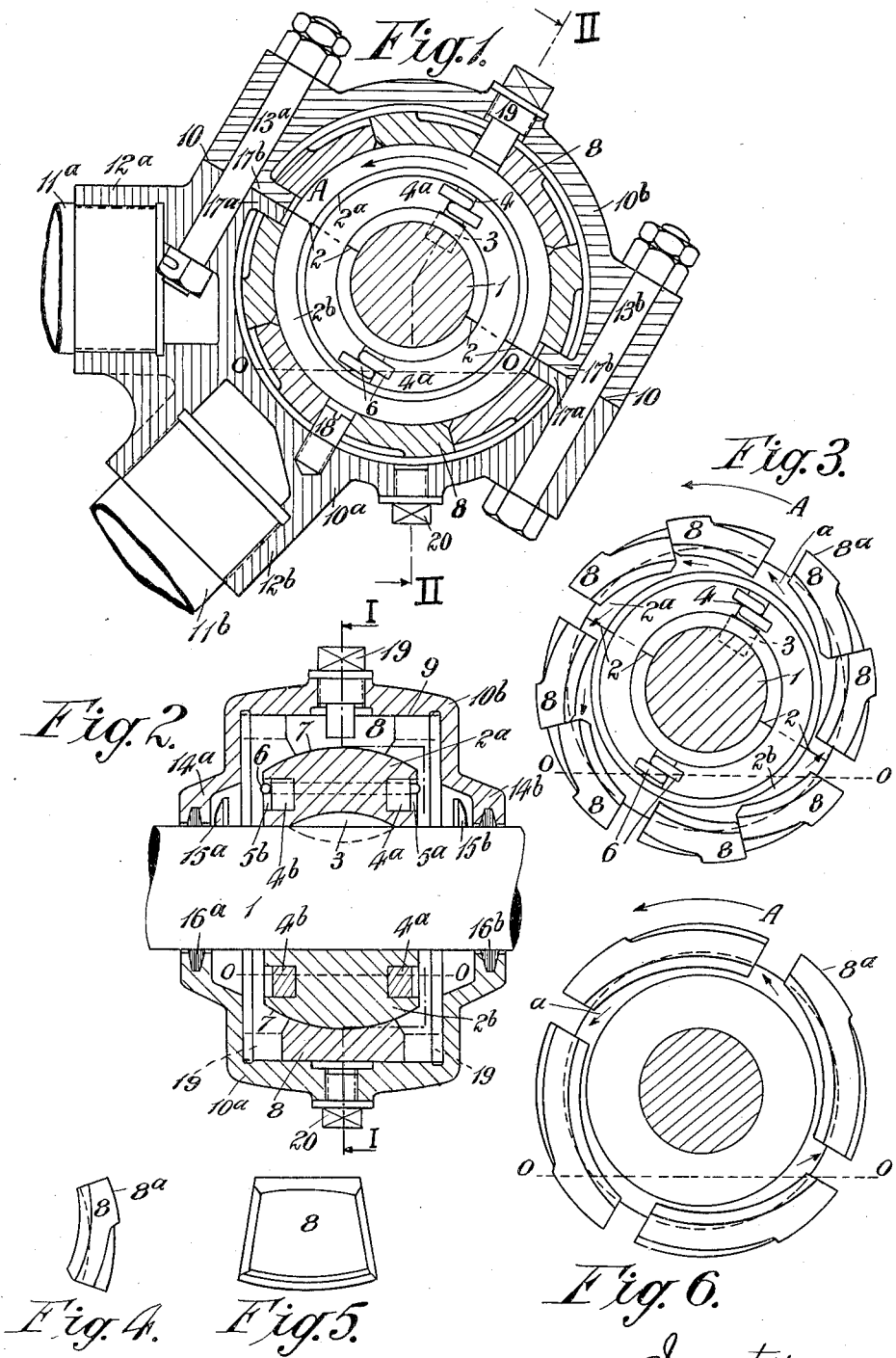
Inventor,
Anthony G. M. Michell,
By Henry Orth
Atty Patented Feb. 15, 1927.

1,617,719

UNITED STATES PATENT OFFICE.

ANTHONY GEORGE MALDON MICHELL, OF MELBOURNE, VICTORIA, AUSTRALIA.

JOURNAL BEARING.

Application filed June 4, 1925, Serial No. 34,985, and in Australia April 29, 1925.

The present invention refers to journal bearings and has been devised to provide an improved construction of same wherein the usual cylindrical surface of the revolving journal member is replaced by a convex spherical surface, and the corresponding stationary members, usually called brasses, are formed with a corresponding concave surface to co-act with said spherical surface.
Both the rotating and stationary members of the bearing are also specially constructed in other respects as hereinafter described to admit of self-alignment of the journal and when desired, of a certain useful amount of end thrust being carried by the journal bearing, thus enabling a thrust-bearing to be dispensed with in cases where the thrust load is relatively small compared to the journal load.
In addition while incorporating the features mentioned the construction of the bearing will permit of cheap and rapid production to standardized dimensions.

In the following description the bearing selected as an example is a line-shaft bearing for a horizontal shaft, but it is to be understood that its application is not so limited as with certain modifications and adaptations it can be used as a bearing for other than line-shafts, as hereinafter indicated.

In the accompanying drawings. Fig. 1 is a section, transverse to the shaft, on line I, I of Fig. 2, and Fig. 2 a section parallel to the shaft, on the broken line II, II of Fig. 1, of a bearing constructed according to the invention. Fig. 3 is an end-view of the internal parts of the bearing, Fig. 4 an end-view, and Fig. 5 a plan view of the inner face of one of the brasses. Fig. 6 is an end-view corresponding to Fig. 3, showing a modified arrangement.

The shaft 1, to which the bearing is applied, is fitted as shown in Figs. 1, 2 and 3, with a journal bush in two parts $2^a$, $2^b$, meeting on a diametral joint 2. This journal bush is bored to fit the shaft, and secured thereon by a key 3. The two parts $2^a$, $2^b$, are held together by rings $4^a$, $4^b$, fitting tightly in grooves $5^a$, $5^b$, turned in the ends of the bush concentric with the shaft. The rings $4^a$, $4^b$, are each in approximately semi-circular halves with intervening open joints 4, in a diametral plane at right angles to the diametral joint 2. In order to hold the rings $4^a$, $4^b$, securely in place, wires or rods 6, of a suitable tough metal are fitted in holes drilled longitudinally through the halves $2^a$, $2^b$, of the bush in the plane of the joint 4. The ends of the wires or rods 6 are bent and pressed down firmly over the ends of the semicircular rings $4^a$, $4^b$, as shown in Figs. 1 to 3. The peripheral surface 7, of the bush $2^a$, $2^b$, is accurately formed to a spherical shape and forms the bearing surface of the journal, running upon the corresponding concave spherical surfaces of the brasses 8, one of which is shown separately in Figs. 4 and 5. These brasses are preferably of generally similar form to the bearing shoes described in the specification of United States Patent No. 1,507,020 dated September 2, 1924, being longer in the direction of the length of the shaft at their front than at their rear edges. In other words, their circumferential edges are inclined or "taper" towards one another in the direction of the motion of the shaft (see Fig. 5). The brasses are supported upon the internal cylindrical surface 9 of the casing of the bearing by means of projections $8^a$ situated towards the rear or "leading-out" ends having regard to the direction of rotation of the journal, whereby wedge-shaped lubricating interspaces are provided between the brasses and the bearing surface 7.

The casing of the bearing is formed in two parts $10^a$, $10^b$, fitting together on an oil-tight diametral joint 10. In the line-shaft bearing illustrated, the lower part $10^a$ is arranged to be supported by the arms $11^a$, $11^b$, of a wall bracket. these arms being tubes screwed into hollow bosses $12^a$, $12^b$. The upper part $10^b$ of the bearing casing is arranged as a detachable cover, being secured to the lower part $10^a$ by bolts $13^a$, $13^b$. The end walls of the casing have central extensions $14^a$, $14^b$, forming chambers which are provided with oil-scrapers $15^a$, $15^b$, and packing rings $16^a$, $16^b$, serving to prevent loss of oil from the casing along the shaft 1.

In order to prevent the brasses 8 from rotating with the journal, and to retain them in position during assembly and dis-assembly, pairs of lugs $17^a$, $17^b$, are formed on the lower and upper parts $10^a$, $10^b$, of the casing as shown, and screws 18 and 19 are fitted in these parts respectively, such lugs and screws engaging in spaces between the blocks 8 to secure the brasses against displacement circumferentially or radially inwards. The screw 19 serves also to close the hole by which the bearing is filled with oil, while another screw 20 in the bottom of the lower part 10ª of the casing serves to close the hole through which the oil is drawn off.

The construction shown in Fig. 6 differs from that shown in the previous figures only in that the previously described spherical journal surface 7 is formed on a collar in one piece (which may either be integral with the shaft, or fixed thereon after being slipped over it from one end), and that a smaller number of brasses are used. The modes of support and operation of these brasses in Fig. 6 are the same as those described in connection with the preceding figures, and with the exception of the journal collar all the parts of the bearing can be assembled, as in the construction shown in the other figures, without longitudinal movement with respect to the shaft.

For lubrication of the bearing the casing is filled with oil to approximately the level shown by the line 00 in Figs. 1, 2, 3 and 4, the lower portion of the journal member and at least one of the brasses, being immersed. When the shaft and journal member revolve, (in the direction of the arrows, A, in Figs. 1, 3 and 6) the oil, adhering to the spherical surface and outer portions of the end surfaces of the journal member, is thrown outwardly by centrifugal force over the said spherical surface, and entering the circumferential spaces between the brasses is supplied freely to the leading-in edges of the latter from which it is fed by the motion of the journal member into the wedge-shaped interspaces between the bearing surfaces and thus establishing film lubrication. This action is facilitated by the "tapering" of the circumferential edges of the brasses, which allows of the outward flow of the oil under the action of centrifugal force, (as indicated by the arrows, a, in Figs. 3 and 6), and also permits the same kind of capillary action as is explained in the United States Patent No. 1,507,020 above cited.

The interior peripheral surface of the parts 10ª, 10ᵇ, of the bearing casing on which the brasses are supported being cylindrical, allows longitudinal movement of all the internal parts of the bearing with respect to the casing. In the use of a number of bearings on a single line of shafting, such freedom would be allowed in all except one of the bearings, in which latter the brasses would be fixed longitudinally by any suitable means as for example by means of circumferential rings 19, 19, each made in semi-circular halves, fitted between the brasses and the ends of the casing as indicated in dotted lines in Fig. 2.

What I claim and desire to secure by Letters Patent is:—

1. In a journal bearing in combination, a rotating bearing member in two parts separated by a longitudinal joint, and having a common peripheral bearing surface in the form of an annular segment of a sphere truncated on both sides on planes transverse to the axis of rotation, two-part rings engaging said sides for securing the said two parts of the bearing member together, and stationary bearing members arranged circumferentially to said rotating member having segmental spherical bearing surfaces co-acting with the said peripheral bearing surface.

2. In a journaled bearing, a rotating bearing member in two parts separated by a longitudinal joint, and secured to each other by two-part rings fitting in circular grooves formed in the axially terminal surfaces of the said bearing member, with axial tie-members for said rings extending through said bearing member.

3. In a journal bearing in combination, a cylindrical shaft, a two-part annular member concentrically affixed to said shaft, a plurality of circumferentially arranged brasses co-acting with said journal surface, two-part rings fitting in concentric grooves in said annular member, and a fixed casing supporting and enclosing said brasses and journal member.

Dated this 28th day of April, 1925.

ANTHONY GEORGE MALDON MICHELL.